US008923855B2

(12) United States Patent
Fletcher et al.

(10) Patent No.: US 8,923,855 B2
(45) Date of Patent: Dec. 30, 2014

(54) USER DEVICE STATUS INFORMATION SYSTEM

(71) Applicant: Verizon Patent and Licensing Inc., Basking Ridge, NJ (US)

(72) Inventors: Hugh Herrick Fletcher, Mountain View, CA (US); Piyush Jethwa, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 219 days.

(21) Appl. No.: 13/682,500

(22) Filed: Nov. 20, 2012

(65) Prior Publication Data
US 2014/0141772 A1    May 22, 2014

(51) Int. Cl.
*H04W 4/00* (2009.01)
*H04W 8/02* (2009.01)

(52) U.S. Cl.
CPC ...................................... *H04W 8/02* (2013.01)
USPC ...... 455/433; 455/421; 455/456.1; 455/432.1; 370/328

(58) Field of Classification Search
CPC .............. G06Q 30/02; G06Q 30/0208; G06Q 30/0261; G06Q 30/0267; H04L 67/04; H04L 67/20; H04L 67/22; H04L 67/322; H04W 4/02; H04W 4/12; H04W 64/00; H04W 8/12; H04W 4/16; H04W 8/02
USPC ........... 455/404.2, 418–419, 421, 432.1–433, 455/435.1, 456.1; 370/328–338
See application file for complete search history.

(56) References Cited

U.S. PATENT DOCUMENTS

| 2002/0072352 A1* | 6/2002 | Jana et al. ...................... 455/414 |
| 2007/0167167 A1* | 7/2007 | Jiang .............................. 455/453 |
| 2007/0238470 A1* | 10/2007 | Griffith et al. ................. 455/455 |

* cited by examiner

*Primary Examiner* — Quan M Hua

(57) ABSTRACT

A device may receive a request for information associated with a status of a user device from an application server device. The device may determine, based on the request, whether the user device is connected to a first network and may provide a first response to the application server device when the user device is connected to the first network. The first response may indicate that the user device is connected to the first network. When the user device is not connected to a first network, the device may determine whether the user device is connected to a second network that is different than the first network. When the user device is connected to the second network, the device may provide a second response to the application server device. The second response may indicate that the user device is connected to the second network.

20 Claims, 10 Drawing Sheets

USER DEVICE STATUS INFORMATION SYSTEM

BACKGROUND

A content provider provides content to a user device (e.g., a wireless mobile device). When the user device is connected to the home cellular network, the content provider may be able to determine information about the user device, such as a type of the network or data charges that may be applicable when providing the content to the user device. However, the content provider is unable to determine this information when the user device is roaming (e.g., not connected to the home cellular network).

DETAILED DESCRIPTION OF PREFERRED EMBODIMENTS

The following detailed description refers to the accompanying drawings. The same reference numbers in different drawings may identify the same or similar elements.

Systems and/or methods described herein may gather and collect information regarding a roaming status of a user device and may provide that information to a content provider. The content provider may utilize the provided roaming information to determine whether to provide content to the user device based on the determined information.

Figure 1A:
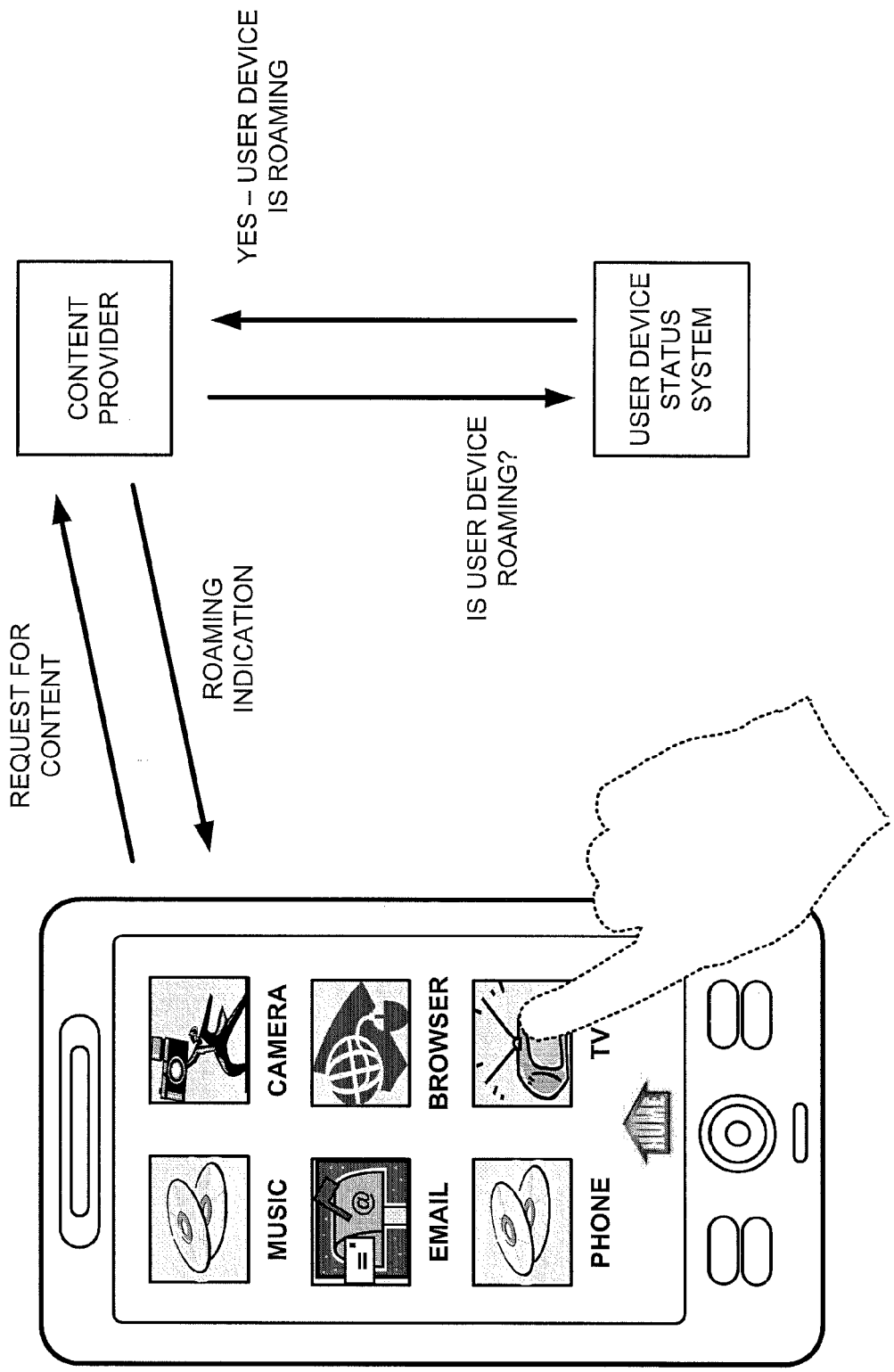
FIGS. 1A and 1B are diagrams illustrating an overview of a user device status system according to implementations described herein.
Figure 1B:
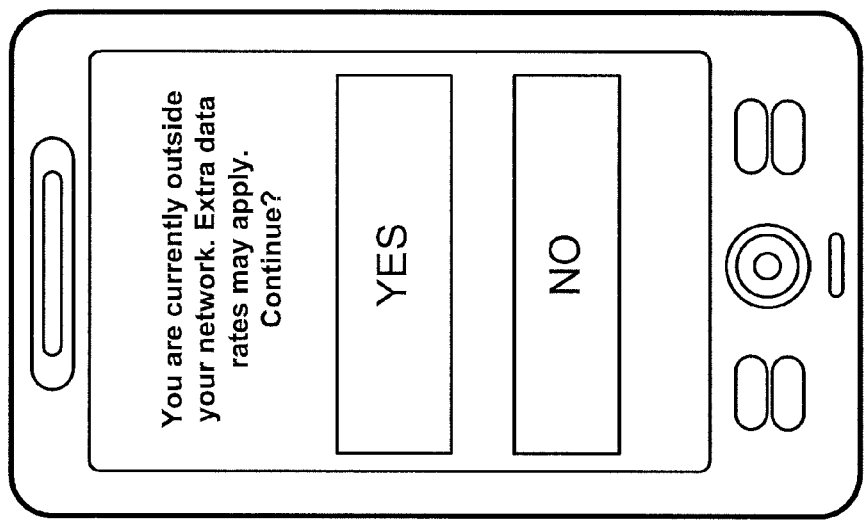

FIGS. 1A and 1B are diagrams illustrating an overview of implementations, as described herein. Referring to FIG. 1A, assume that a user desires to view a television show on a wireless mobile device (e.g., user device). The user may select a particular application for providing the television show and content corresponding to the television show may be requested from a content provider. In response to the request, the content provider may send a status request to a user device status system requesting to know if the user device is connected to the user device's home cellular network or if the user device is roaming (e.g., not connected to the user device's home cellular network). In response to the status request, the content provider may receive, from the user device status system, a status response indicating that the user device is currently roaming.

Because the user device is currently roaming, the content provider may require an acknowledgement from the user indicating that the user is aware that the user device is currently roaming and that the content provider should still provide the requested content. As shown in FIG. 1B, the content provider may cause the user device to display the message "You are currently outside your network. Extra data rates may apply. Continue?" The content provider may require the user to select "YES" prior to providing the requested content.

A carrier may refer to one or more of a mobile network operator (MNO), a mobile phone operator, a carrier service provider (CSP), a wireless service provider, a wireless carrier, a cellular company, and/or any other company that provides cellular data service(s) to users (e.g., subscribers of the carrier) via a network. A home cellular network of a user device may refer to a network provided and operated by a particular carrier that provides cellular data service(s) to the user device.

Figure 2:
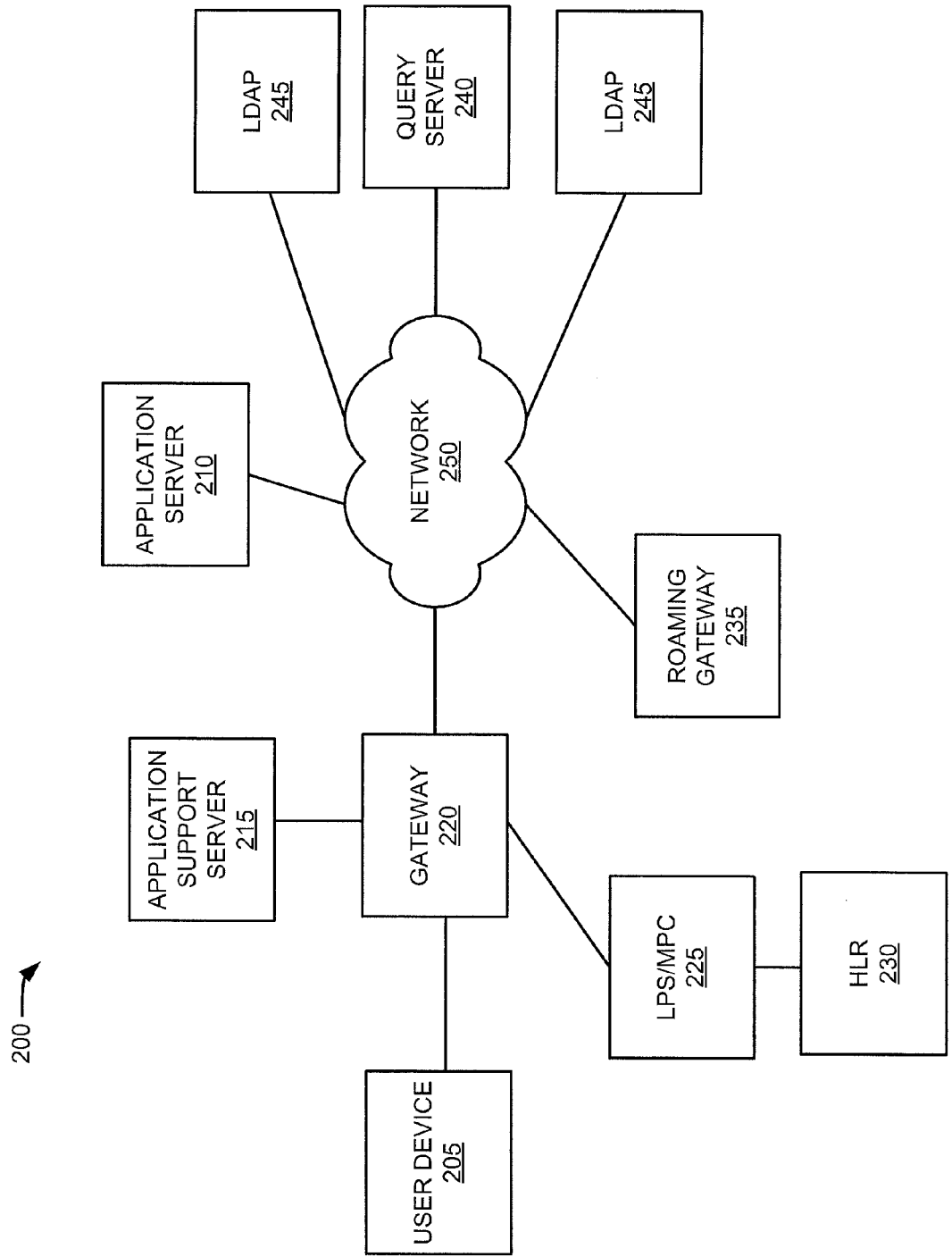
FIG. 2 is a diagram of an environment in which systems and/or methods, described herein, may be implemented.

FIG. 2 is a diagram of an environment 200 in which systems and/or methods described herein may be implemented. As shown in FIG. 2, environment 200 may include user device 205, application server device 210, application support server device 215, gateway device 220, location proxy server/mobile position center device (LPS/MPC) 225, home location register (HLR) device 230, roaming gateway device 235, query server device 240, and lightweight directory access protocol (LDAP) devices 245 interconnected by network 250. Devices of environment 200 may interconnect via wired connections, wireless connections, or a combination of wired and wireless connections.

User device 205 may include one or more devices capable of communicating (e.g., transmitting and/or receiving voice, text, images, and/or multimedia data) via a cellular network. For example, user device 205 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a computer (e.g., a desktop computer, a laptop computer, a tablet computer, etc.), a personal gaming system, and/or another similar type of device.

In some implementations, user device 205 may be associated with a home cellular network. In some implementations, user device 205 may be associated with a home cellular network that comprises a Third Generation (3G) network. For example, user device 205 may be associated with a home cellular network that may include an access network operating under wireless protocols other than Long Term Evolution (LTE) standards (e.g., a network other than a Fourth Generation (4G) network). In some implementations, user device 205 may be associated with a home cellular network that includes an access network that conforms to network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Application server device 210 may include one or more server devices capable of providing content to user device 205. In some implementations, application server device 210 may provide a media stream, such as a video stream, an audio stream, a textual stream, and/or any other type or form of content.

In some implementations, application server device 210 may host and/or execute applications and/or services that permit user device 205 to communicate with other user devices. For example, application server device 210 may host one or more applications that allows user device 205 to communicate via text message, voice, video messaging (e.g., voice over IP), chat, e-mail, social media, and/or voicemail (e.g., searchable voicemail) with other user devices.

In some implementations, application server device 210 may be a web server that hosts a website from which user device 205 can receive applications, data, and/or services. In some implementations, application server device 210 may be a content delivery server that provides broadcast video streams, Video on Demand (VoD) content, or other multimedia content. In some implementations, application server device 210 may provide location-based services.

Application support server device 215 may include one or more server devices capable of receiving roaming status requests regarding user device 205 (e.g., from application server device 210) and may communicate with one or more other devices (e.g., LPS/MPC device 225, roaming gateway device 235, query server device 240, and/or LDAP device 245) to determine information regarding a roaming status of user device 205.

Gateway device 220 may include one or more devices capable of providing access to a wireless network (e.g., network 250) to user device 205, server device 210, and/or application support server device 215. For example, gateway device 220 may include one or more server devices, network devices (e.g., gateways, routers, switches, firewalls, network interface cards (NICs), hubs, bridges, optical add-drop multiplexers (OADMs), etc.), etc. In some implementations, application support server device 215 may be included in, or co-located with, gateway device 220. In some implementations, application support server device 215 may be connected to gateway device 220 via network 250.

LPS/MPC device 225 may include one or more devices that use Signaling System 7 (SS7) and/or Signaling Transport (SIGTRAN) to communicate data via a wireless network (e.g., network 250). In some implementations, LPS/MPC device 225 may be associated with the home cellular network of user device 205 and may communicate with HLR device 230 to provide roaming status information regarding user device 205 to application support server device 215.

HLR device 230 may include one or more devices that store information about subscribers of a network. In some implementations, HLR device 230 may include a central database that contains details of each subscriber that is authorized to use the home cellular network. For example, user device 205 may register with HLR device 230 when user device 205 accesses the home cellular network and HLR device 230 may store roaming status information regarding user device 205 in its central database. In some implementations, the HLR device 230 may store information that includes a mobile device number (MDN) of user device 205, a mobile switching center identifier (MSCID) associated with user device 205, information identifying a carrier providing service to user device 205, location information for user device 205, and/or information regarding an operational status of user device 205 (e.g., whether a user device is turned on or off).

Roaming gateway device 235 may include one or more devices that provide roaming status information for a user device. In some implementations, roaming gateway device 235 may include one or more server devices, network devices (e.g., gateways, routers, switches, firewalls, network interface cards (NICs), hubs, bridges, optical add-drop multiplexers (OADMs), etc.), etc.

In some implementations, roaming gateway device 235 may be associated with a visited cellular network with respect to user device 205 (e.g., a network other than the home cellular network of user device 205). In some implementations, roaming gateway device 235 may be associated with a 3G network that may include an access network operating under wireless protocols other than LTE standards. For example, roaming gateway device 235 may be associated with a network that includes an access network that conforms to network protocols, such as, for example, GSM, WCDMA, UMB, UMTS, CDMA2000, HSPA, WiMax, etc. In some implementations, roaming gateway device 235 may receive requests for status information regarding user device 205 (e.g., from application support server device 215) and may communicate with one or more devices (e.g., a visited location register (VLR) device) to determine roaming status information relating to user device 205.

Query server device 240 may include one or more devices that provide roaming status information for a user device. In some implementations, query server 240 may be associated with a LTE network. In some implementations, query server device 240 may include a central database that contains information that identifies a carrier providing services for user device 205 within the LTE network. In some implementations, query server device 240 may receive requests for carrier information associated with user device 205 from application support server device 215 and may access the central database to determine the carrier information.

LDAP devices 245 may include one or more devices that store roaming information for a user device. In some implementations, each LDAP device 245 may be associated with a particular carrier providing services within the LTE network. LDAP devices 245 may receive requests for roaming status information regarding user device 205 and may communicate with one or more devices associated with the LTE network to determine the requested roaming status information. For example, LDAP devices 245 may communicate with a home subscriber server (HSS) that maintains a central database storing status information for user devices accessing the LTE network to determine the requested status information.

Network 250 may include one or more wired and/or wireless networks. For example, network 250 may include a cellular network, a public land mobile network ("PLMN"), a second generation ("2G") network, a third generation ("3G") network, a fourth generation ("4G") or LTE network, a fifth generation ("5G") network, other types of network such as a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Although FIG. 2 shows example components of environment 200, in other implementations, environment 200 may include fewer components, different components, differently arranged components, or additional components than those depicted in FIG. 2. In some implementations, one or more components of environment 200 may perform one or more tasks described as being performed by one or more other components of environment 200.

Figure 3:
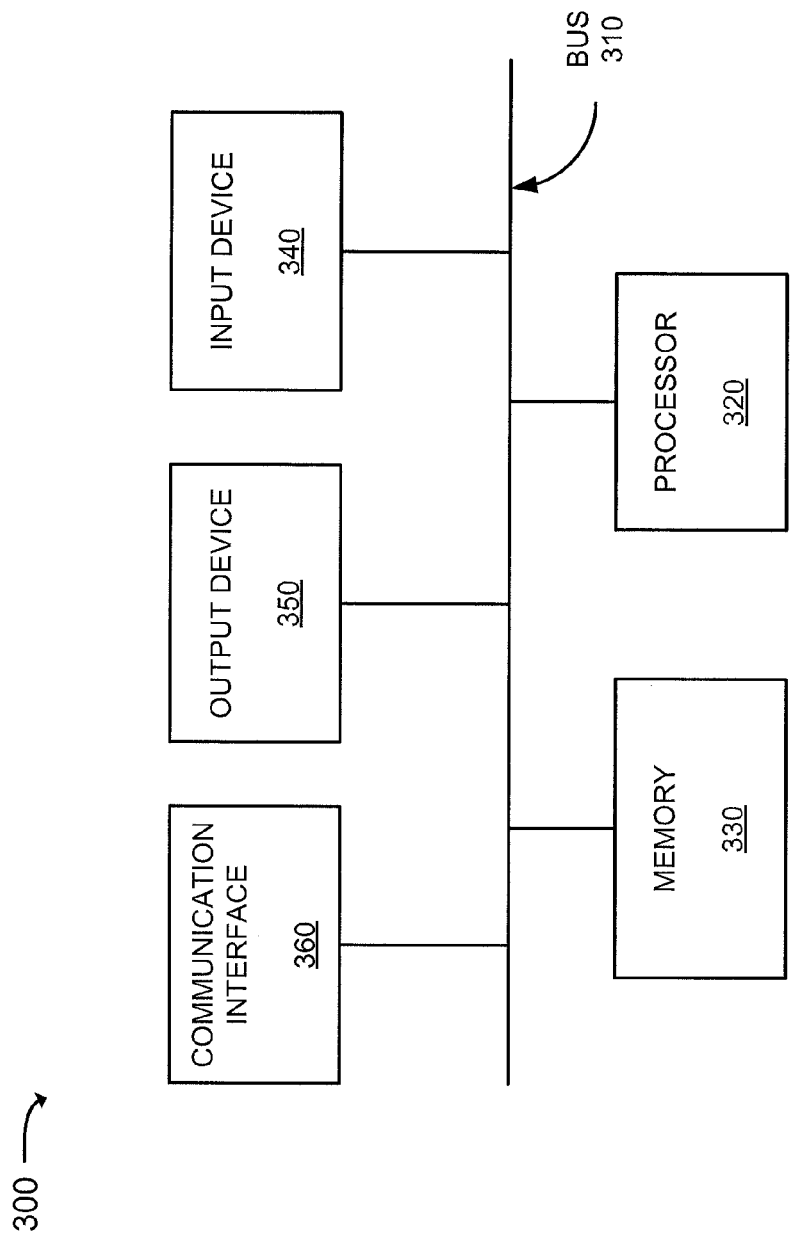
FIG. 3 illustrates example components of a device that may be used within the environment of FIG. 2 according to one or more implementations described herein.

FIG. 3 illustrates example components of a device 300 that may be used within environment 200. Device 300 may correspond to user device 205, application server device 210, application support server device 215, gateway device 220, LPS/MPC device 225, HLR device 230, roaming gateway device 235, query server device 240, and/or LDAP devices 245. In some implementations, user device 205, application server device 210, application support server device 215, gateway device 220, LPS/MPC 225, HLR device 230, roaming gateway device 235, query server device 240, and/or LDAP device 245 may include one or more devices 300 and/or one or more components of device 300.

As shown in FIG. 3, device 300 may include bus 310, processor 320, memory 330, input device 340, output device 350, and communication interface 360. Bus 310 may include a path that permits communication among the components of device 300. Processor 320 may include a processor, a microprocessor, an application specific integrated circuit (ASIC), a field programmable gate array (FPGA), or another type of processor that interprets and executes instructions. Memory 330 may include a random access memory (RAM) or another type of dynamic storage device that stores information or instructions for execution by processor 320, a read-only memory (ROM) or another type of static storage device that stores static information or instructions for processor 320, and/or a magnetic storage medium, such as a hard disk drive, or a removable memory, such as a flash memory.

Input device 340 may include a mechanism that permits an operator to input information to device 300, such as a control button, a keyboard, a keypad, a touch screen interface, a microphone, a camera, a video recorder, or another type of input device. Output device 350 may include a mechanism that outputs information to the operator, such as a light emitting diode (LED), a display, a speaker, or another type of output device. Communication interface 360 may include any transceiver-like mechanism that enables device 300 to communicate with other devices or networks. In one implementation, communication interface 360 may include a wireless interface, a wired interface, or a combination of a wireless interface and a wired interface.

Device 300 may perform certain operations, as described in detail below. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices.

The software instructions may be read into memory 330 from another computer-readable medium or from another device via communication interface 360. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. In some implementations, one or more components of device 300 may perform one or more tasks described as being performed by one or more other components of device 300.

Figure 4:
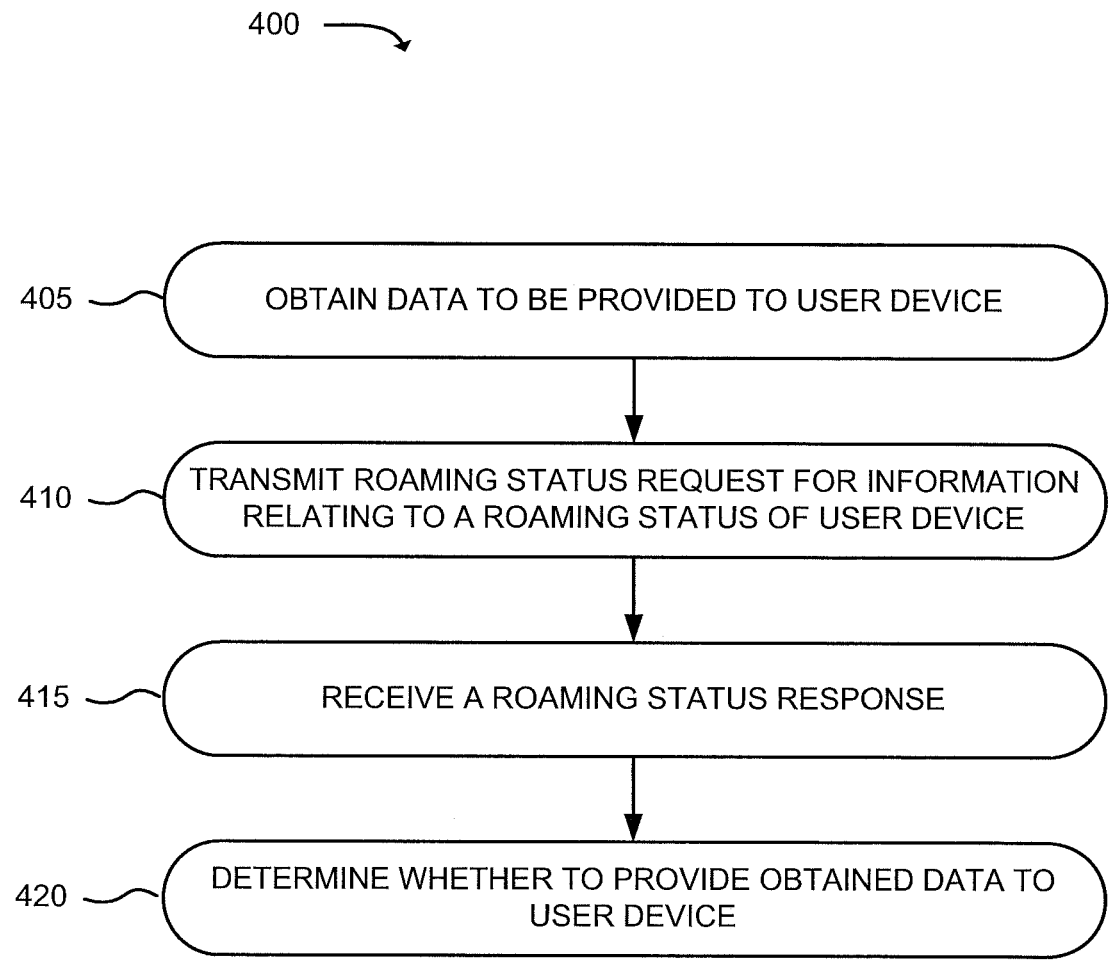
FIG. 4 is a flow chart of an example process for providing data to a user device.

FIG. 4 is a flow chart of an example process 400 for providing data to user device 205. In some implementations, process 400 may be performed by application server device 210. In other implementations, one or more blocks of process 400 may be performed by one or more devices instead of, or possibly in conjunction with, application server device 210.

As shown in FIG. 4, process 400 may include obtaining data to be transmitted to a user device (block 405). For example, application server device 210 may obtain data to be transmitted to user device 205. In some implementations, application server device 210 may obtain data to be transmitted to user device 205 in response to user device 205 requesting the data. For example, user device 205 may include an application that can be used to communicate with and/or request data from application server device 210 such as an e-mail application, a video conferencing application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

In some implementations, the application may cause the data to be requested from application server 210 in response to an input received from a user of user device 205. For example, a user may select an application for watching a video on user device 205. In response to the selection, the application may request data corresponding to the video and application server device 210 may obtain the particular data in response to the request.

In some implementations, application server device 210 may include an application that obtains and/or generates data to be transmitted to user device 205 without requiring user device 205 to request the data. For example, application server device 210 may access stored subscriber information and determine that a user of user device 205 is a subscriber of a particular service to receive a particular type of data (e.g., audio and/or video content, weather data, etc.) via application server device 210. Application server device 210 may obtain the particular type of data based on the user subscribing to the particular service.

Process 400 may include transmitting a roaming status request (block 410). For example, application server device 210 may transmit a roaming status request for information relating to a roaming status of user device 205. In some implementations, application server device 210 may transmit a roaming status request for information relating to a roaming status of user device 205 to application support server device 215. For example, application server device 210 may transmit a roaming status request that includes information identifying a mobile device number (MDN) or other identifying information of user device 205. Additionally and/or alternatively, the roaming status request may request information regarding an operating status of user device 205 (e.g., whether user device 205 is turned on or off), location information for user device 205, and/or information identifying a network that user device is currently connected to.

Process 400 may include receiving a roaming status response (block 415). For example, application server device 210 may receive a roaming status response that includes information regarding a roaming status of user device 205. In some implementations, application server device 210 may receive the roaming status response from application support server device 215.

Process 400 may include determining whether to provide the obtained data to user device 205 (block 420). For example, application server device 210 may determine whether to provide the obtained data to user device 205 based on information included in the roaming status response. In some implementations, application server device 210 may determine to provide the obtained data to user device 205 when user device 205 is connected to the home cellular network. For example, application server device 210 may determine that user device 205 is connected to the home cellular network based on information included in the roaming status response (e.g., an identifier or other information indicating whether user device 205 is connected to the home cellular network) and may determine to provide the obtained data to user device 205 based on user device 205 being connected to the home cellular network.

In some implementations, application server device 210 may determine not to provide data to user device 205 when user device 205 is roaming and not connected to the home cellular network. For example, to avoid charges associated with transmitting data over a visited cellular network (e.g., transmitting data to user device 205 when user device 205 is roaming), application server device 210 may determine not to transmit data to user device 205 when user device 205 is not connected to the home cellular network.

In some implementations, application server device 205 may determine to delay providing data to user device 205 when user device 205 is not connected to the home cellular network. For example, when user device 205 is not connected to the home cellular network, application server device 2105 may delay providing data to user device 205 until user device 205 is connected to the home cellular network.

In some implementations, when user device 205 is roaming, application server device 210 may determine updated roaming status information for user device 205 and determine whether to provide the obtained data based on the updated roaming status information.

In some implementations, when user device 205 is roaming, application server device 210 may determine whether to provide the obtained data to user device 205 based on other factors. For example, application server device 210 may determine whether to provide the obtained data to user device 205 based on profile information associated with user device 205, receiving an acknowledgement from user device 205, location information of user device 205, data rates associated with providing the obtained data to user device 205, whether user device is likely to be connected to the home cellular network within a particular amount of time, a carrier currently providing services to user device 205, and/or a type of network with which user device 205 is currently connected.

In some implementations, when user device 205 is not connected to the home cellular network, application server device 210 may provide modified data to user device 205. For example, application server device 210 may determine a location of user device 205 based on location information included in the roaming status response. Based on the location information, application server device 210 may replace one or more portions of the obtained data with different data to form the modified data and may provide the modified data to user device 205.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5:
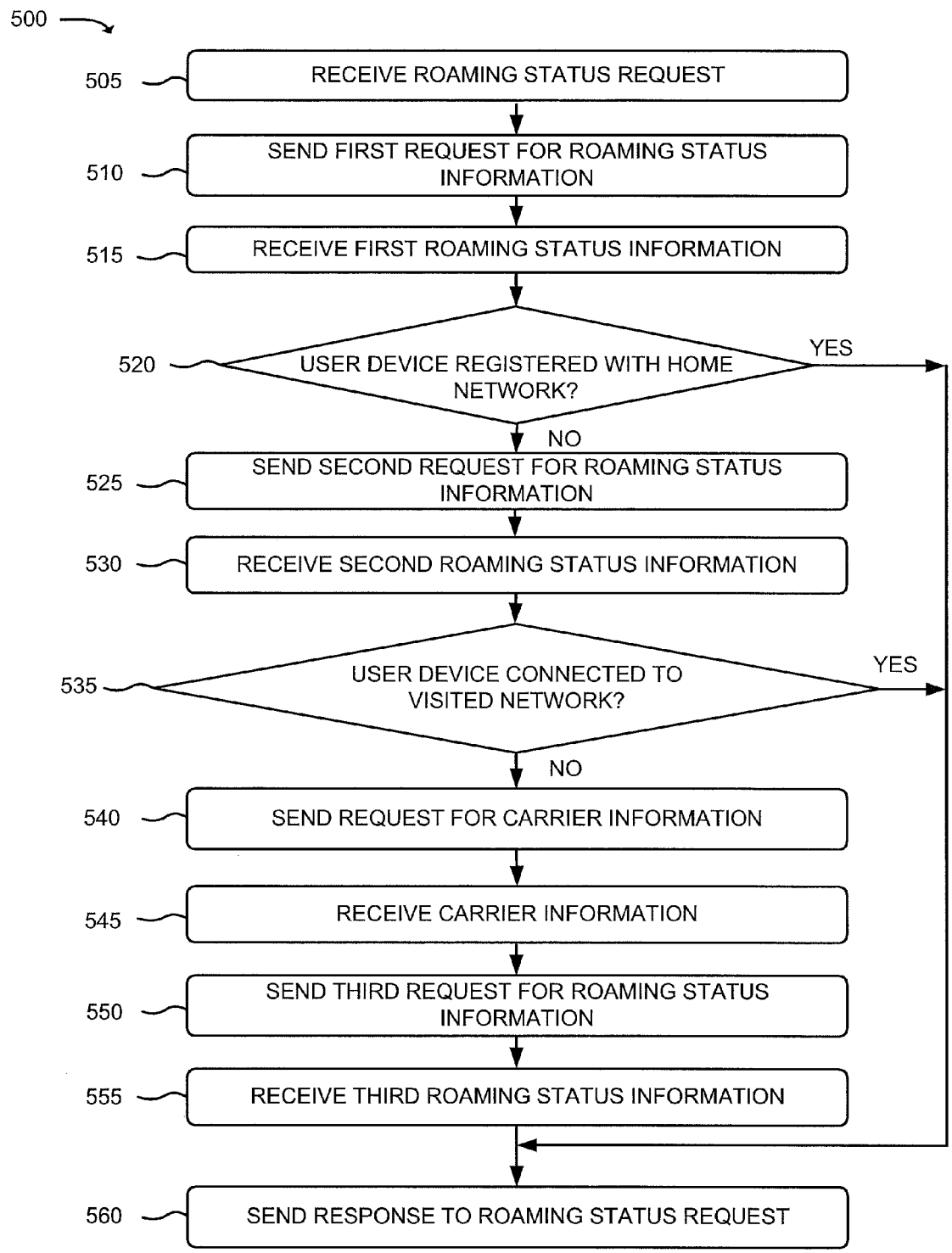
FIG. 5 is a flow chart of an example process for determining roaming status information for a user device.

FIG. 5 is a flow chart of an example process 500 for determining roaming status information relating to user device 205. In some implementations, process 500 may be performed by application support server device 215. In other implementations, one or more blocks of process 500 may be performed by one or more devices instead of, or possibly in conjunction with, application support server device 215.

As shown in FIG. 5, process 500 may include receiving a roaming status request (block 505). For example, application support server device 215 may receive a roaming status request for information regarding a roaming status of user device 205. In some implementations, application support server device 215 may receive the roaming status request from application server device 210. For example, application support server device 215 may receive the roaming status request from application server device 210 based on application server device 210 obtaining data to be provided to user device 205 as described above with respect to process 400.

In some implementations, application support server device 215 may receive the roaming status request from gateway device 220. For example, gateway device 220 may intercept or receive data being transmitted to user device 205 (e.g., data transmitted by application server device 210 to user device 205 via gateway device 220). Gateway device 220 may generate and send the roaming status request to application support server device 215 to determine whether to provide the data to user device 205 in a manner similar to that described above with respect to process 400.

Process 500 may include sending a first request for roaming status information (block 510). For example, application support server device 215 may transmit a first request for roaming status information to determine roaming status information regarding user device 205. In some implementations, application support server device 215 may determine a home cellular network of user device 205 and may transmit the first request to one or more devices associated with the home cellular network to determine the roaming status information regarding user device 205. In some implementations, the roaming status request may include a device identifier (e.g., a mobile directory number (MDN), a mobile identification number (MIN), etc.) or other information that identifiers user device 205. Application support server device 215 may determine the home cellular network of user device 205 based on the device identifier and may transmit the first request for roaming status information to one or more devices associated with the home cellular network. In some implementations, application support server device 215 may determine that LPS/MPC device 225 and/or HLR device 230 are associated with the home cellular network of user device 205 and may transmit the first request for roaming status information to LPS/MPC device 225 and/or HLR device 230.

In some implementations, the first request for roaming status information may request information regarding whether user device 205 is reachable or unreachable via the home cellular network. For example, application support server device 210 may transmit a getStatus message that requests information regarding a particular MDN (e.g., user device 205).

In some implementations, application support server device 215 may transmit the first request for roaming status information to LPS/MPC device 225. LPS/MPC device 225 may receive the first request for roaming status information and may determine first roaming status information for user device 205. In some implementations, LPS/MPC device 225 may query HLR device 230 for information regarding user device 205. For example, LPS/MPC device 225 may forward the first request for roaming status information to HLR device 230. Additionally and/or alternatively, LPS/MPC device 225 may request routing information for user device 205 from HLR device 230. For example, LPS/MPC device 225 may transmit a short message service request (SMSREQ) message to HLR device 230 to determine routing information for user device 205.

In some implementations, LPS/MPC device 225 may determine the first roaming status information based on information received from HLR device 230. For example, in response to being queried by LPS/MPC device 225, HLR device 230 may determine roaming status information for user device 205. In some implementations, HLR device 230 may access stored information to determine whether user device 205 is registered with HLR device 230. In some implementations, HLR device 230 may determine that user device 205 is not registered with HLR device 230 (e.g., user device 205 is not connected to the home cellular network or is unreachable via the home cellular network). HLR device 230 may transmit information to LPS/MPC device 225 indicating that user device 205 is not connected to or is unreachable via the home cellular network. LPS/MPC device 225 may determine the first roaming status information based on the information indicating that user device 205 is not connected to or is unreachable via the home cellular network.

In some implementations, HLR device 230 may determine that user device 205 is registered with HLR device 230 (e.g., user device 205 is currently connected to the home cellular network or is reachable via the home cellular network). HLR device 230 may transmit information to LPS/MPC device 225 indicating that user device 205 is connected to or is reachable via the home cellular network. For example, HLR device 230 may transmit information identifying a MSC (e.g., MSCID) for routing data to user device 205. LPS/MPC device 225 may determine the first roaming status information based on the information indicating that user device 205 is connected to or is reachable via the home cellular network.

In some implementations, HLR device 230 may determine that user device 205 is registered with HLR device 230 and may transmit information regarding an operational state of user device 205 to LPS/MPC device 225. For example, HLR device 230 may transmit information identifying whether user device 205 is currently turned on or off. LPS/MPC device 225 may determine the first roaming status information based on the information regarding the operational state of user device 205.

In some implementations, HLR device 230 may determine that user device 205 is registered with HLR device 230 and may transmit information indicating that user device 205 is currently connected to a network associated with the home cellular network (e.g., a partner network). For example, HLR device 230 may transmit information identifying MSC of a partner network (e.g., an MSCID) to LPS/MPC device 225. LPS/MPC device 225 may determine the first roaming status information based on the MSCID of the MSC of the partner network.

In some implementations, HLR device 230 may determine that user device 205 is registered with HLR device 230 and may transmit location information for user device 205. For example, HLR device 230 may access stored data to determine a location of user device 205 and may transmit information identifying the location of user device 205 (e.g., a country code, a region code, an address of a user of user device 205, etc.) to LPS/MPC device 225. LPS/MPC device 225 may determine the first roaming status information based on the location information determined for user device 205.

Process 500 may include receiving first roaming status information (block 515). For example, application support server device 215 may receive first roaming status information from one or more devices associated with the home cellular network in response to sending the first request for roaming status information. In some implementations, application support server device 215 may receive first roaming status information from LPS/MPC device 225. In some implementations, application support server device 215 may receive first roaming status information from HLR device 230.

Process 500 may include determining whether user device 205 is connected to the home cellular network (block 520). For example, application support server device 215 may determine whether user device 205 is connected to the home cellular network. In some implementations, application support server device 215 may determine that user device 205 is connected to the home cellular network based on the first roaming status information. For example, application support server device 215 may determine that user device 205 is connected to the home cellular network based on the first roaming status information including routing information or other information indicating that user device is reachable via the home cellular network (e.g., MSCID).

In some implementations, application support server device 215 may determine that user device 205 is not connected to the home cellular network. For example, application support server device 215 may determine that the first roaming status information includes information indicating that user device 205 is not reachable or is not connected to the home cellular network. Additionally or alternatively, application support server device 215 may determine that the first roaming status information does not include routing information for user device 205. Application support server device 215 may determine that user device 205 is not connected to the home cellular network based on the first roaming status information not including the routing information.

In those instances where user device 205 is determined to be connected to the home cellular network (block 520—YES), process 500 may proceed as described below with respect to block 560. In those instances where user device 205 is determined not to be connected to the home cellular network (block 520—NO), process 500 may included sending a second request for roaming status information (block 525). For example, application support server 215 may send a second request for roaming status information based on determining that user device 205 is not connected to the home cellular network.

In some implementations, application support server device 215 may transmit the second request for roaming status information to one or more devices associated with a visited cellular network (e.g., a network other than the home cellular network). For example, application support server device 215 may transmit the second roaming status request to roaming gateway device 235. In response to receiving the second request for roaming status information, roaming gateway device 235 may determine second roaming status information for user device 205. Roaming gateway device 235 may determine the second roaming status information in a manner similar to that described above with respect to block 510. For example, roaming gateway device 235 may query a visited location register (VLR) device associated with roaming gateway device 235. Roaming gateway device 235 may receive information regarding the roaming status of user device 205 from the VLR device and may determine the second roaming status information based on the received information.

Process 500 may include receiving second roaming status information (block 530). For example, application support server device 215 may receive second roaming status information from one or more device of the visited cellular network in response to sending the second request for roaming status information. In some implementations, application support server device 215 may receive the second roaming status information from roaming gateway device 235. In some implementations, application support server device 215 may receive the second roaming status information from a VLR device associated with the visited cellular network.

Process 500 may include determining whether user device 205 is connected to a visited cellular network (block 535). For example, application support server device 215 may determine whether user device 205 is connected to the visited cellular network. In some implementations, application support server device 215 may determine that user device 205 is connected to the visited cellular network based on the second roaming status information. For example, application support server device 215 may determine that user device 205 is connected to the visited cellular network based on the second roaming status information including routing information or other information indicating that user device is reachable via the visited cellular network (e.g., based on the second roaming status information including information identifying a MSCID associated with the visited cellular network).

In some implementations, application support server device 215 may determine that user device 205 is not connected to the visited cellular network. For example, application support server device 215 may determine that the second roaming status information includes information indicating that user device 205 is not reachable or is not connected to the visited cellular network. Additionally or alternatively, application support server device 215 may determine that the second roaming status information does not include routing information for user device 205. Application support server device 215 may determine that user device 205 is not connected to the visited cellular network based on the second roaming status information not including the routing information.

In those instances when user device 205 is determined to be connected to the visited network (block 535—YES), process 500 may proceed as described below with respect to block 560. In those instances when user device 205 is determined not to be connected to the visited network (block 535—NO), process 500 may include sending a request for carrier information (block 540). For example, application support server device 215 may send a request for carrier information to identify a carrier providing service to user device 205.

In some implementations, application support server device 215 may send a request for carrier information to one or more devices included in an LTE network. For example, application support server device 215 may send a request for carrier information to query server device 240 to determine whether user device 205 is connected to the LTE network and/or to obtain information identifying a carrier providing service to user device 205 in the LTE network. For example, application support server device 215 may send a SQL query message that includes, for example, a MDN of user device 205, to query server device 240. In response to the request for carrier information, query server device 240 may determine whether user device 205 is connected to the LTE network and may provide information identifying a carrier providing service to user device 205 in the LTE network. For example, query server device 240 may transmit a SQL response message to application support server device 215 that includes information indicating whether user device 205 is connected to the LTE network and/or information identifying the carrier providing service to user device 205 in the LTE network.

Process 500 may include receiving carrier information (block 545). For example, application support server device 215 may receive carrier information from one or more devices included in the LTE network. In some implementations, application support server device 215 may receive carrier information from query server device 240. In some implementations, application support server device 215 may receive carrier information from a different device such as, for example, a home subscriber service (HSS) device or other device that stores information regarding user devices connected to the LTE network.

Process 500 may include sending a third request for roaming status information (block 550). For example, application support server device 215 may determine that user device 205 is connected to the LTE network and that a particular carrier is providing service to user device 205 in the LTE network based on the received carrier information. Application support server device 215 may send the third request for roaming status information to one or more devices in the LTE network that are associated with the particular carrier. For example, application support server device 215 may determine that a particular LDAP device 245 is associated with the particular carrier and may send the third request for roaming status information to the particular LDAP device 245.

Process 500 may include receiving third roaming status information (block 555). For example, application support server device 215 may receive third roaming status information from one or more devices included in the LTE network. In some implementations, application support server device 215 may receive the third roaming status information from LDAP device 245 in response to LDAP device 245 receiving the third request for roaming status information. For example, in response to receiving the third request for roaming status information, LDAP device 245 may determine the third roaming status information based on information included in the third request for roaming status information. In some implementations, LDAP device 245 may query one or more devices to determine roaming status information regarding user device 205 and may transmit the determined roaming status information as third roaming status information to application support server device 215. For example, LDAP device 245 may query a HSS device that stores information regarding user devices being provided service by the particular carrier identified by query server device 240. LDAP device 245 may determine the third roaming status information based on information received from the HSS device.

Process 500 may include sending a roaming status response (block 560). For example, application support server device 215 may transmit a roaming status response, to application server device 210, in response to the received roaming status request. For example, application server device 210 may transmit the roaming status response to application server device 210 to enable application server device 210 to determine whether to provide data to user device 205 as described with respect to process 400. In some implementations, application support server device 215 may generate the roaming status response based on the first roaming status information, the second roaming status information, and/or the third roaming status information.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Figure 6A:
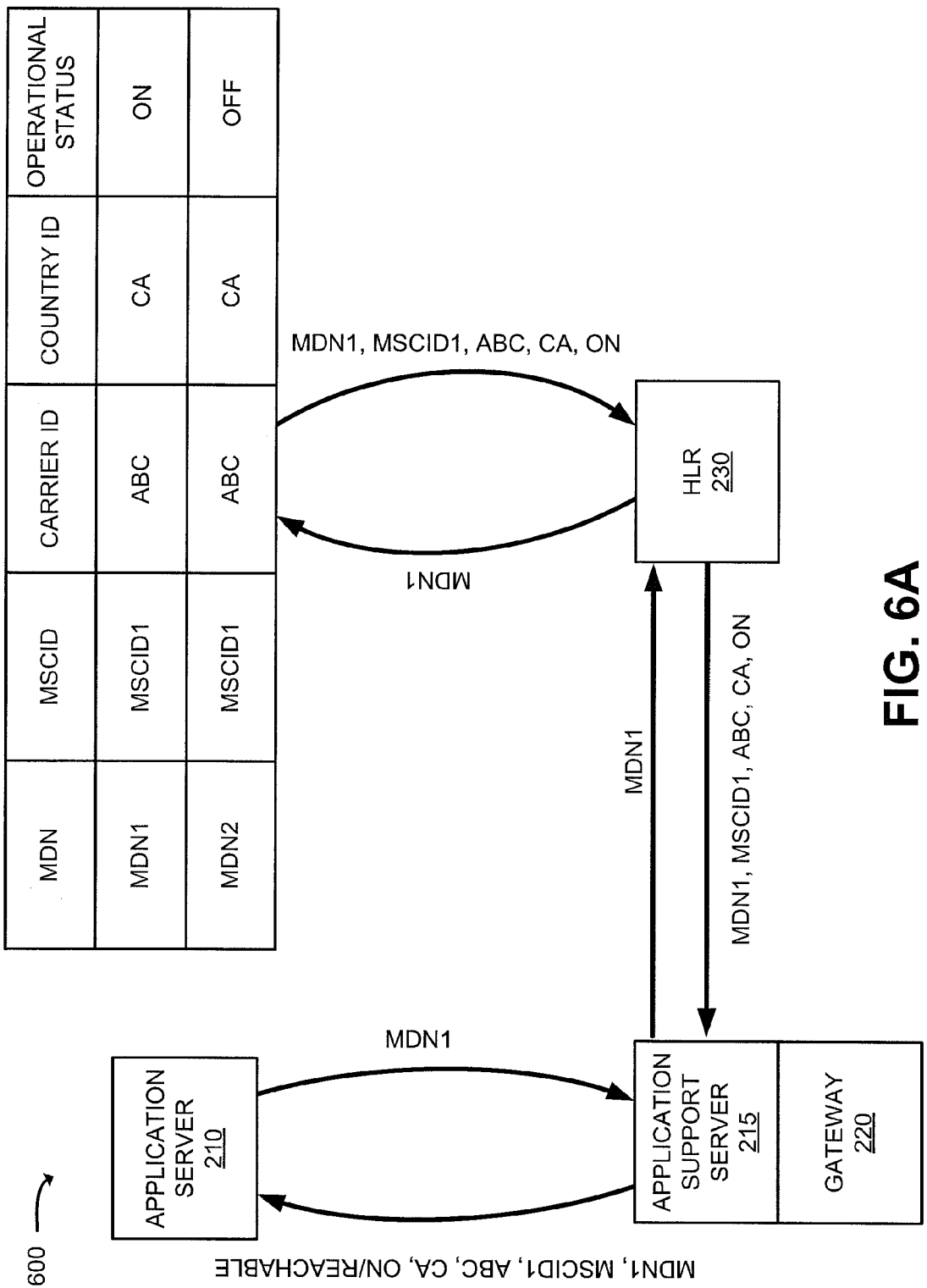
FIGS. 6A-6D are diagrams illustrating call flow diagrams of example operations capable of being performed by an example portion of the environment of FIG. 2.

FIGS. 6A-6D are an example 600 of process 500 described above with respect to FIG. 5. With reference to FIG. 6A, assume that application server device 210 obtains content to be provided to user device 205. Further, assume that application server device 210 is to provide the content to user device 205 when user device 205 is connected to a home cellular network. Thus, application server device 210 may send a roaming status request to application support server device 215, requesting information regarding the roaming status of user device 205. The roaming status request may include an identifier or other information that identifies user device 205 (shown as "MDN1"). Application support server device 215 may receive the status roaming request from application server device 210 and may send a request for roaming status information relating to user device 205 to HLR device 230. The request may include the identifier MDN1 to enable HLR device 230 to identify user device 205. HLR device 230 may receive the request and may provide roaming status information in response to the request. HLR device 230 may use the identifier MDN1 to search a data structure to determine the roaming status information for user device 205.

The data structure may include a collection of fields storing information regarding subscribers/user devices connected to a network associated with HLR device 230. As shown in FIG. 6A, the data structure may include, for example, a MDN field, a MSCID field, a Carrier ID field, a Country ID field, and an Operational status field. The MDN field may store information identifying a mobile directory number (MDN) of user devices currently connected to the network. MSCID field may store information identifying a mobile switching center associated with the user device identified by the MDN field. Carrier ID field may store information identifying a carrier/service provider providing service to the user device identified by the MDN field. Country ID field may store location information of the user device identified by the MDN field. Operational Status field may store information identifying whether the user device identified by the MDN field is turned on or off and/or reachable or unreachable.

HLR device 230 may transmit the determined roaming status information to application support server device 215. The roaming status information may include information regarding the roaming status of user device 205. For example 600, assume that the data structure, associated with HLR device 230, includes status information for user device 205. Thus, as shown in FIG. 6A, the roaming status information may include the MDN of user device 205 (shown as "MDN1"), information identifying the MSC associated with user device 205 (shown as "MSCID1"), information identifying a carrier/service provider currently providing service to user device 205 (shown as "ABC"), location information for user device 205 (shown as "CA"), and information identifying an operational status of user device 205 (shown as "ON").

Application support server device 215 may receive the roaming status information from HLR device 230 and may determine that user device 205 is connected to a network associated with HLR device 230 based on the roaming status information. Application support server 215 may transmit a roaming status response to application server device 210 based on user device 205 being connected to the network associated with HLR device 230. The roaming status response may include information regarding the roaming status of user device 205. As shown in FIG. 6A, the roaming status response may include the MDN of user device 205 (shown as "MDN1"), information identifying the MSC associated with user device 205 (shown as "MSCID1"), information identifying a carrier/service provider currently providing service to user device 205 (shown as "ABC"), location information for user device 205 (shown as "CA"), and information identifying an operational status of user device 205 (shown as "ON/REACHABLE"). In this situation, application server device 210 may determine that user device 205 is connected to the home cellular network and may provide the obtained content to user device 205.

Figure 6B:
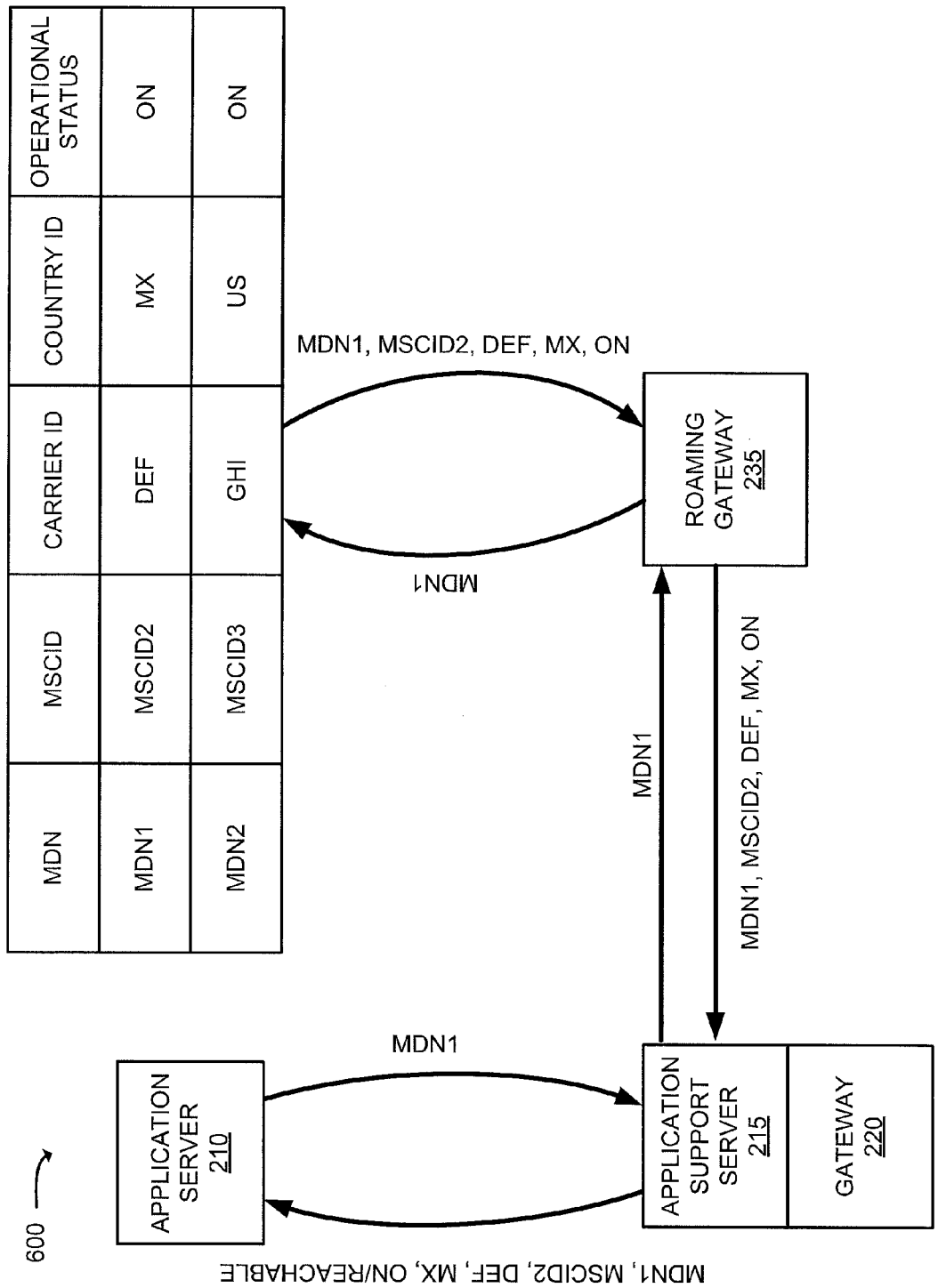

With reference to FIG. 6B, assume that HLR device 230 was unable to provide status information for user device 205. Thus, application support server device 215 may send a request for roaming status information relating to user device 205 to roaming gateway device 235. The request for roaming status information may include the identifier MDN1 to allow roaming gateway device 235 to identify user device 205. Roaming gateway device 235 may receive the request for roaming status information and may provide roaming status information in response to the request.

For example, roaming gateway device 235 may use the identifier MDN1 to search a data structure to determine the roaming status information. The data structure may include a collection of fields similar to the fields described above with respect to FIG. 6A. Roaming gateway device 235 may transmit the determined roaming status information to application support server device 215. The roaming status information may include information regarding the roaming status of user device 205. As shown in FIG. 6B, the roaming status information may include the MDN of user device 205 (shown as "MDN1"), information identifying the MSC associated with user device 205 (shown as "MSCID1"), information identifying a carrier/service provider currently providing service to user device 205 (shown as "DEF"), location information for user device 205 (shown as "MX"), and information identifying an operational status of user device 205 (shown as "ON").

Application support server device 215 may transmit a roaming status response to application server device 210 based on user device 205 being connected to the network associated with roaming gateway device 235. The roaming status response may include information regarding the roaming status of user device 205. As shown in FIG. 6B, the roaming status response may include the MDN of user device 205 (shown as "MDN1"), information identifying the MSC associated with user device 205 (shown as "MSCID2"), information identifying a carrier/service provider currently providing service to user device 205 (shown as "DEF"), location information for user device 205 (shown as "MX"), and information identifying an operational status of user device 205 (shown as "ON/REACHABLE"). In this situation, application server device 210 may determine that user device 205 is not connected to the home cellular network and may determine not to provide the obtained content to user device 205.

Figure 6C:
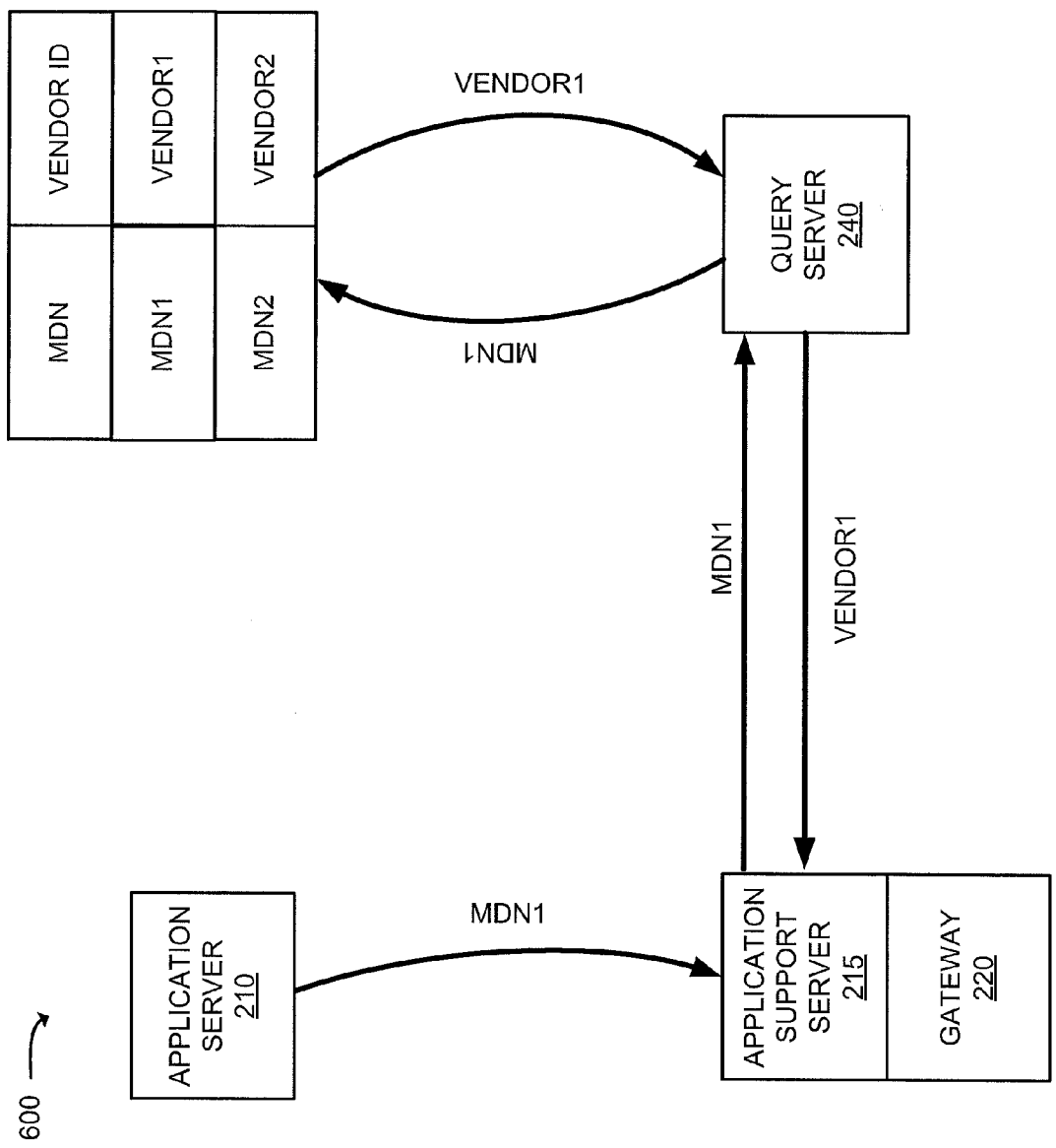

With reference to FIG. 6C, assume that roaming gateway device 235 was unable to provide status information for user device 205. Thus, application support server device 215 may send a request for information for information identifying a carrier that is currently providing services to user device 205 to query server device 240. The request may include the identifier MDN1 to allow query server device 240 to identify user device 205. Query server device 240 may receive the request for carrier information and may provide carrier information in response to the request.

For example, query server device 240 may use the identifier MDN1 to search a data structure to determine the carrier information. The data structure may include a collection of fields storing information regarding user devices connected to an LTE network associated with query server device 240. As shown in FIG. 6C, the data structure may include, for example, a MDN field and a Carrier ID field. The MDN field may store information identifying a mobile directory number (MDN) of user devices currently connected to the LTE network. Carrier ID field may store information identifying a carrier providing service to the user device identified by the MDN field. Query server device 240 may transmit the determined carrier information to application support server device 215. As shown in FIG. 6C, the carrier information may include information identifying the carrier providing service to user device 205 in the LTE (shown as "Vendor1").

Figure 6D:
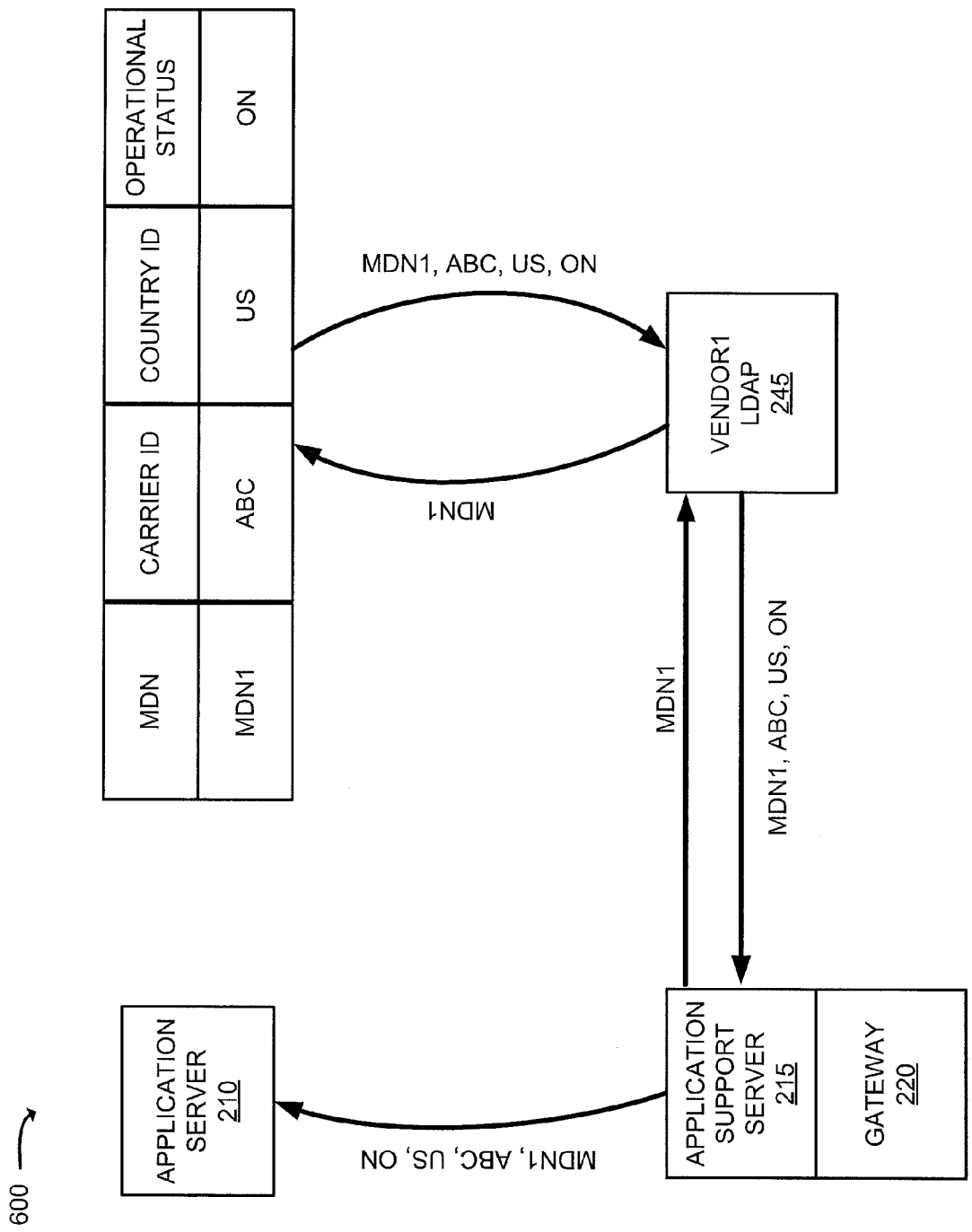

With reference to FIG. 6D, application support server device 215 may determine a LDAP device 245 that is associated with the carrier identified in the carrier information (e.g., Vendor1) and may send a request for roaming status information relating to user device 205 to the determined LDAP device (shown as "Vendor1 LDAP 245"). The request for roaming status information may include the identifier MDN1 to allow Vendor1 LDAP 245 to identify user device 205. Vendor1 LDAP 245 may receive the request for roaming status information and may provide roaming status information in response to the request.

For example, Vendor1 LDAP 245 may use the identifier MDN1 to search a data structure to determine the roaming status information. The data structure may include a collection of fields storing information regarding user devices connected to the LTE network and associated with Vendor1 LDAP 245. As shown in FIG. 6C, the data structure may include a collection of fields similar to the collection of fields of the data structure described above with respect to FIG. 6A

Vendor1 LDAP 245 may transmit the determined roaming status information to application support server device 215. The roaming status information may include information regarding the roaming status of user device 205. As shown in FIG. 6D, the roaming status information may include the MDN of user device 205 (shown as "MDN1"), information identifying a carrier/service provider currently providing service to user device 205 (shown as "ABC"), location information for user device 205 (shown as "US"), and information identifying an operational status of user device 205 (shown as "ON").

Application support server device 215 may transmit a roaming status response to application server device 210 based on user device 205 being connected to the LTE network. The roaming status response may include information regarding the roaming status of user device 205. As shown in FIG. 6D, the roaming status response may include the MDN of user device 205 (shown as "MDN1"), information identifying a carrier/service provider currently providing service to user device 205 (shown as "ABC"), location information for user device 205 (shown as "US"), and information identifying an operational status of user device 205 (shown as "ON/REACHABLE"). In this situation, application server device 210 may determine that user device 205 is not connected to the home cellular network and may determine not to provide the obtained content to user device 205.

The foregoing description provides illustration and description, but is not intended to be exhaustive or to limit the embodiments to the precise form disclosed. Modifications and variations are possible in light of the above teachings or may be acquired from practice of the implementations. For example, while the above description focused on providing roaming status information for a user device, implementations, described herein, are equally applicable to providing status information that includes additional types of information, such as information identifying a location of the user device (e.g., a country code, a region code, an address of a user of the user device, etc.), information regarding a MSC associated with the user device (e.g., a MSCID), information regarding a state of the user device (e.g., whether the user device is turned on or off), information identifying a type of network to which the user device is connected (e.g., 3G, 4G, LTE, etc.), and/or information identifying a carrier providing service(s) to the user device.

As used herein, the term device is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
    transmitting, by a first network device, a first request for roaming status information of a user device,
        the first request for roaming status information being transmitted to a device associated with a first network;
    receiving, by the first network device, first information based on the first request;
    determining, by the first network device, that the user device is not connected to the first network based on the first information;
    transmitting, by the first network device, a second request for roaming status information to a device associated with a second network,
        the second request for status information being transmitted based on the user device not being connected to the first network, and
        the second network being different from the first network;
    receiving, by the first network device, second information based on transmitting the second request;
    determining, by the first network device, whether the user device is connected to the second network based on the second information;
    obtaining, by the first network device and when the user device is not connected to the second network, carrier information from a device associated with a third network;
    determining, by the first network device that a particular carrier, of a plurality of carriers associated with the third network, provides service to the user device based on the carrier information;
    obtaining, by the first network device, third information from a device associated with the particular carrier;
    determining, by the first network device, whether the user device is connected to the third network based on the third information.

2. The method of claim 1, where the first network comprises a home network of the user device; and
    where the device associated with the home network comprises a home location register of the home network.

3. The method of claim 1, further comprising:
    receiving a status request from a device associated with a content provider;

generating a response to the status request based on the first information, the second information, and the third information; and transmitting the response to the status request to the device associated with the content provider.

4. The method of claim 1, where the third network is different from the first network and the second network.

5. The method of claim 1, where obtaining the third information includes:

transmitting a third request for roaming status information to the device associated with the particular carrier.

6. The method of claim 1, where the first network and the second network comprise a third generation network, and where the third network comprises a fourth generation network.

7. The method of claim 1, where transmitting the first roaming request for status information includes:

transmitting a mobile device number of the user device to the device associated with the first network.

8. A device comprising:

a processor to:

receive, from an application server, a request for information associated with a roaming status of a user device, determine, based on the request, whether the user device is connected to a first network, provide, to the application server and when the user device is connected to the first network, a first response, the first response indicating that the user device is connected to the first network, determine, when the user device is not connected to a first network, whether the user device is connected to a second network, the second network being different from the first network, provide, to the application server and when the user device is connected to the second network, a second response, the second response indicating that the user device is connected to the second network, obtain, when the user device is not connected to the second network, carrier information from a query server associated with a third network, determine that a particular carrier, of a plurality of carriers associated with the third network, provides service to the user device, obtain information associated with the user device from a device associated with the particular carrier, determine whether the user device is connected to the third network based on the information associated with the user device, and provide, to the application server and when the user device is connected to the third network, a third response, the third response indicating that the user device is connected to the third network.

9. The device of claim 8, where the third network is different from the first network and the second network.

10. The device of claim 8, where the first network and the second network comprise a first type of network and the third network comprises a second type of network that is different than the first type of network.

11. The device of claim 8, where the first network comprises a third generation network and the third network comprises a fourth generation network.

12. The device of claim 8, where the first network comprises a first cellular network associated with a first carrier, and where the second network comprises a second cellular network associated with a second carrier.

13. The device of claim 8, where the first network comprises a first access network associated with a first wireless transmission protocol, and where the second network comprises a second access network associated with a second wireless transmission protocol.

14. A computer-readable medium storing instructions, the instructions comprising:

one or more instructions that, when executed by a processor, cause the processor to:

receive a request for information associated with a status of a user device, determine, based on the request, whether the user device is connected to a first network, generate, when the user device is connected to the first network, a first response, the first response indicating that the user device is connected to the first network, determine, when the user device is not connected to a first network, whether the user device is connected to a second network, the second network being different from the first network, generate, when the user device is connected to the second network, a second response, the second response indicating that the user device is connected to the second network, obtain, when the user device is not connected to the second network, carrier information from a query server associated with a third network, obtain information associated with the user device from a device associated with a particular carrier, of a plurality of carriers associated with the third network, determine whether the user device is connected to the third network based on the information associated with the user device, and generate, when the user device is connected to the third network, a third response, the third response indicating that the user device is connected to the third network.

15. The computer-readable medium of claim 14, where the third network is different from the first network and the second network.

16. The computer-readable medium of claim 14, where the one or more instructions to determine whether the user device is connected to the first network include:

one or more instructions to provide information identifying a mobile device number to a home location register device of the first network.

17. The computer-readable medium of claim 14, where the first network includes a first access network associated with a first wireless transmission protocol, and where the second network includes a second access network associated with a second wireless transmission protocol that is different than the first wireless transmission protocol.

18. The computer-readable medium of claim 14, where the first network comprises a home cellular network of the user device and the second network comprises a visited cellular network with respect to the user device.

19. The computer-readable medium of claim 14, where the first network comprises a third generation network and the third network comprises a higher generation network when compared to the first network.

20. The method of claim 1, further comprising:
receiving, from an application server, a request for information associated with a roaming status of the user device; and
providing, to the application server, information indicating whether the user device is connected to the first network, the second network, or the third network.

* * * * *